A. B. ARCTANDER.
COOKING UTENSIL.
APPLICATION FILED MAR. 27, 1911.
1,034,563.
Patented Aug. 6, 1912.
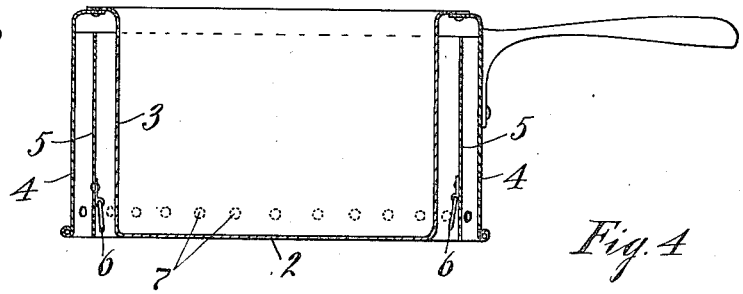
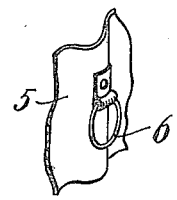
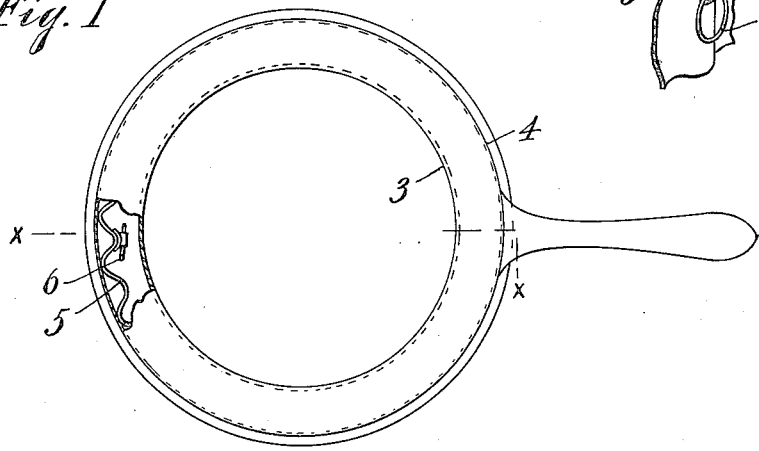
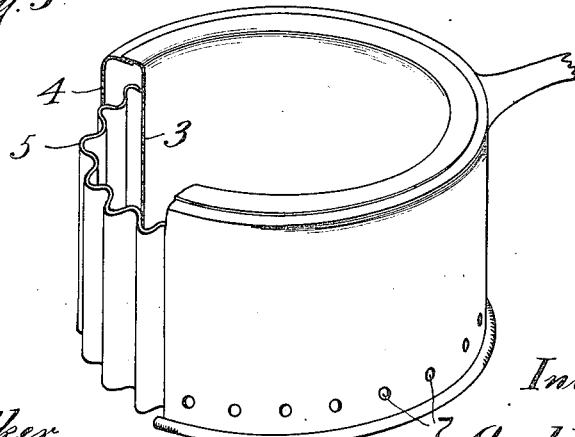

UNITED STATES PATENT OFFICE.

AXEL B. ARCTANDER, OF ST. PAUL, MINNESOTA.

COOKING UTENSIL.

1,034,563.  Specification of Letters Patent.  Patented Aug. 6, 1912.

Application filed March 27, 1911. Serial No. 617,164.

*To all whom it may concern:*

Be it known that I, AXEL B. ARCTANDER, a citizen of the United States, residing at St. Paul, in the county of Ramsey and State of Minnesota, have invented certain new and useful Improvements in Cooking Utensils, of which the following is a specification.

My invention relates to improvements in culinary vessels, its object being particularly to provide means for causing a circulation of heated air from underneath the vessel upwardly against the outer wall of the vessel, thereby utilizing the heat in the most economical and efficient manner.

To this end my invention consists in the features of construction, combination, and arrangement of parts hereinafter described and claimed.

In the accompanying drawings forming part of this specification, Figure 1 is a plan view of my invention; Fig. 2 is a section on line x—x of Fig. 1; Fig. 3 is a perspective view of the invention partly broken away; and Fig. 4 is a detail view of a portion of a removable partition wall forming part of my invention.

Referring to the drawings the main vessel comprises the usual bottom 2 and side walls 3.

4 represents an outer wall spaced from the inner wall, said outer wall being in the nature of an outwardly and downwardly turned extension of the inner wall. This wall may, as shown in the drawings, be a separate wall suitably secured at its upper end to the adjacent upper end of the inner wall. The chamber between the inner and outer walls being open at the bottom will receive the heated air from the stove below.

In order to secure a circulation of the heated air upwardly through the chamber alongside the outer surface of the inner wall the chamber is divided by means of the upright division wall 5. The wall 5 as shown is corrugated and in use is shoved upwardly into the chamber between the inner and outer walls of the utensil, being held against the outer wall by its spring pressure. When inserted in the chamber, as shown in Figs. 2 and 3, the partition wall terminates short of the upper end of the chamber and extends downwardly to the lower end of the chamber, said partition wall being provided at its lower end with suitable means as the rings 6 to permit of its removal. The outer wall is shown provided with openings 7 at its lower end to allow the escape of heated air where the bottom of the chamber is closed by reason of the utensil resting upon a flat stove.

In using my utensil for cooking, the heated air will rise in the inner side of the chamber against the outer surface of the inner wall passing over the top of the partition wall and downwardly between the partition wall and outer wall and escaping underneath the outer wall or through the openings 7. This provides perfect circulation of the heated air upwardly along the outer surface of the inner wall of the vessel, thereby economically utilizing the heat. The form of partition wall shown is particularly efficient; the corrugated character of the wall causes it to reflect more heat than a straight wall and also allows it to be held in position by its own spring pressure, avoiding the use of any special fastening means and making it easily removable for the purposes of cleaning, etc.

I claim as my invention:

1. A culinary vessel of the class described having inner and outer side walls, said walls being connected at their upper ends and spaced at their lower ends to form an intermediate open bottom chamber, a partition wall vertically disposed within said chamber and separated from the upper end of said chamber by an air passage, the lower end of the outer side wall being ported and said partitoin wall extending downwardly to the bottom of the vessel, whereby said air passage at its inner end communicates with the space below said vessel and at its opposite or outer end opens laterally through the outer side wall to the outer air.

2. A culinary vessel of the class described formed with inner and outer side walls, said walls being connected at their upper ends and spaced at their lower ends to form an intermediate open bottom chamber, and a vertically corrugated partition wall removably held within said chamber by its own spring pressure.

3. A culinary vessel of the class described formed with inner and outer side walls, said walls being connected at top and spaced at bottom to constitute an intermediate open bottom chamber, said outer wall being formed with openings at its lower end, and a vertically corrugated partition wall removably supported within said chamber and separated from the upper end of the chamber by an air passage.

In testimony whereof I affix my signature in presence of two witnesses.

AXEL B. ARCTANDER.

Witnesses:
  H. S. JOHNSON,
  H. SMITH.